Figure 1:
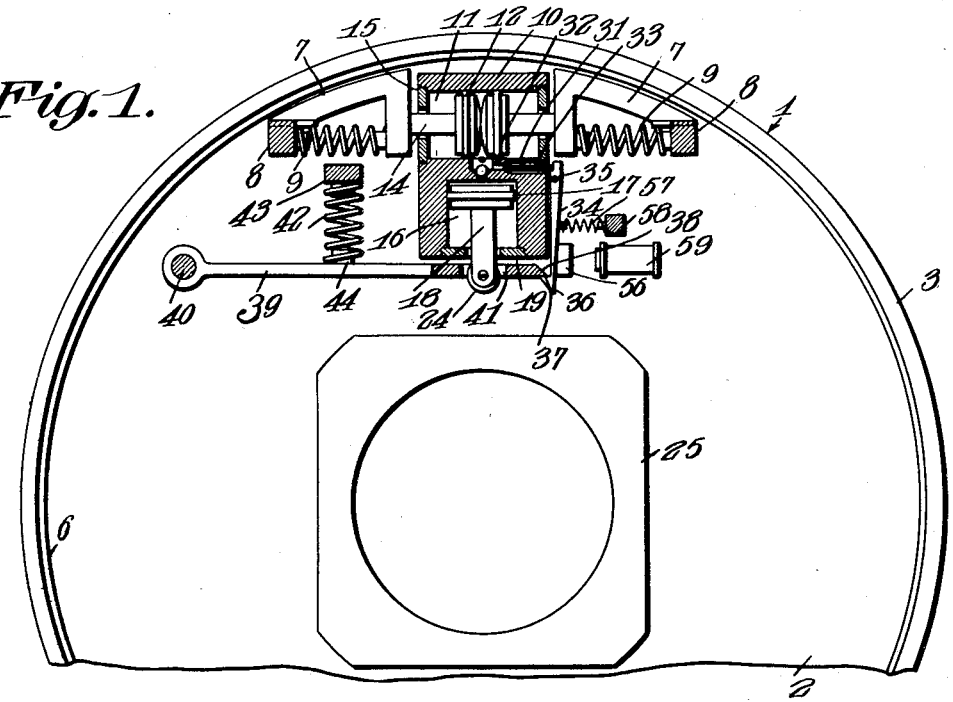

March 10, 1925.  1,529,097

N. A. TUCKER

ELECTRIC AIR BRAKE

Filed May 12, 1924  2 Sheets-Sheet 1

N. A. Tucker,
Inventor

March 10, 1925.

N. A. TUCKER

ELECTRIC AIR BRAKE

Filed May 12, 1924

1,529,097

2 Sheets-Sheet 2

Inventor.

N. A. Tucker

By C. A. Snow & Co.

Attorneys.

Patented Mar. 10, 1925.

1,529,097

UNITED STATES PATENT OFFICE.

NELSON ASAPH TUCKER, OF CASCADE, NEW HAMPSHIRE.

ELECTRIC AIR BRAKE.

Application filed May 12, 1924. Serial No. 712,695.

*To all whom it may concern:*

Be it known that I, NELSON ASAPH TUCKER, a citizen of the United States, residing at Cascade, in the county of Coos and State of New Hampshire, have invented a new and useful Electric Air Brake, of which the following is a specification.

This invention aims to provide novel means whereby a brake may be applied by air to the wheels of an automobile, novel means being provided for releasing the brake, and for controlling the braking pressure.

It is within the province of the disclosure to improve generally and to enhance the utility of devices of that type to which the invention appertains.

Although a preferred form of the invention is shown in the drawings, it will be understood that a mechanic, working within the scope of what is claimed, may make changes, without departing from the spirit of the invention.

Figure 2:
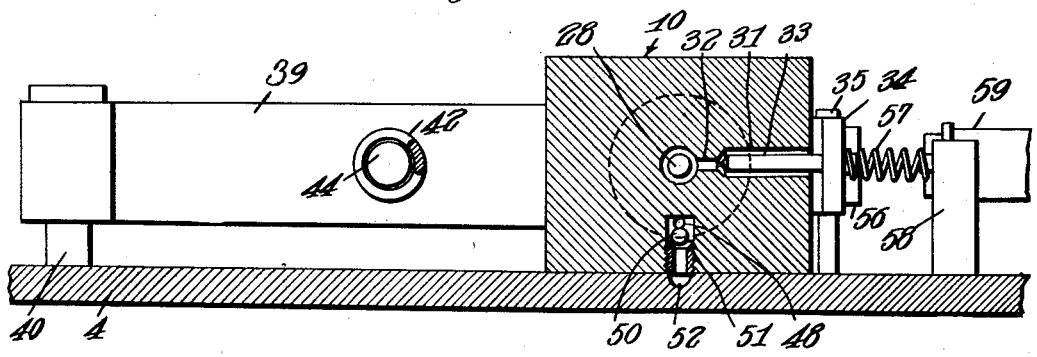
Figure 3:
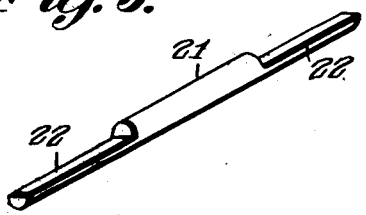
Figure 4:
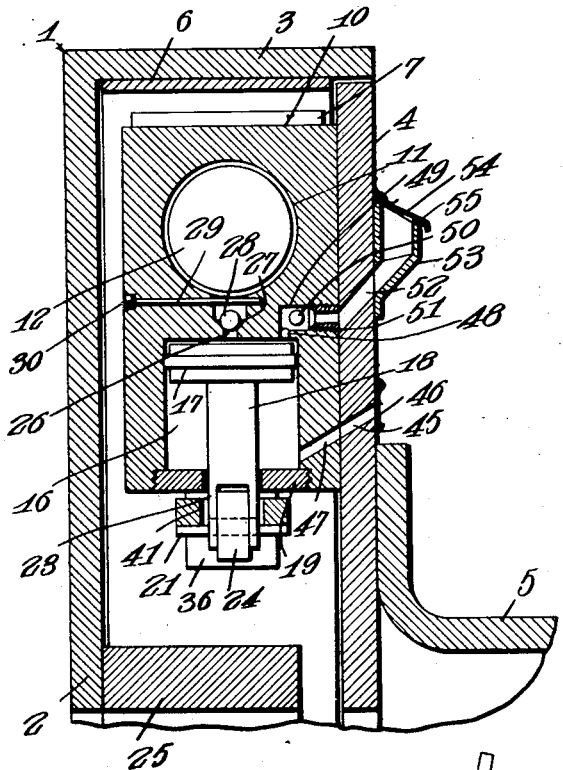
Figure 5:
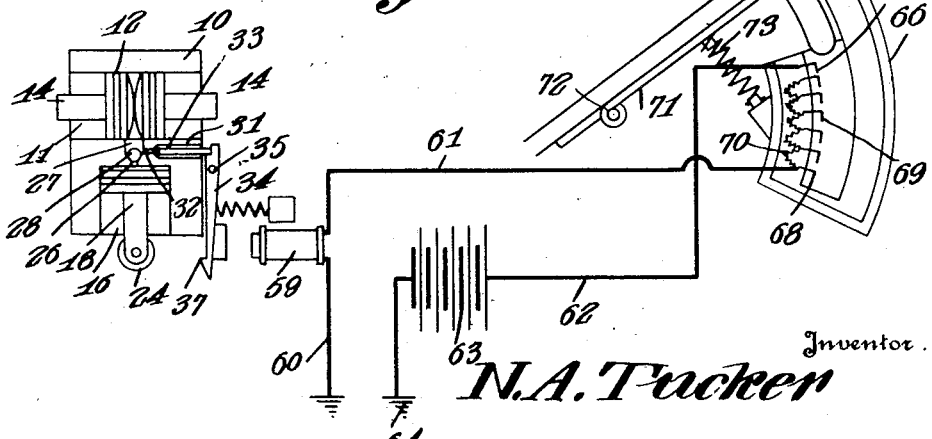

In the drawings:—Figure 1 shows, in vertical section, a device constructed in accordance with the invention, parts appearing in elevation; Figure 2 is a transverse section wherein parts appear in elevation; Figure 3 is a perspective view showing the shaft on which one of the rollers is journaled; Figure 4 is a vertical section taken at right angles to the cutting plane in Figure 1; Figure 5 is a diagrammatic view illustrating the circuits and attendant parts.

The device forming the subject matter of this application may be applied to all of the wheels of a vehicle, either front or back, but since there is no patentable novelty in mere duplication, and with a view to simplify the showing, it will be supposed that the device is applied to a rear wheel, it being left to a mechanic to apply the device to any or all of the vehicle wheels.

In the accompanying drawings, the numeral 1 indicates a brake drum, adapted to turn with the wheel of a motor propelled vehicle, and including an end wall 2 and a circumferential flange 3 provided with a lining 6. The closure member of the brake drum 1 is marked by the numeral 4 and constitutes a support for many working parts of the device, the closure member being mounted on the axle housing 5. The closure 4 of the brake drum 1 has projections 8.

Shoes 7 are adapted to cooperate with the lining 6 of the brake drum and are mounted slidably on the projections 8 of the closure 4. Compression springs 9 are interposed between the projections 8 and the inwardly extended ends of the shoes 7 to move the shoes away from the lining 6 of the brake drum as shown in Figure 1. Disposed between the shoes 7 and mounted on the member 4 is a casing 10 having a transverse brake cylinder 11, wherein operate brake pistons 12, the stems 14 of which are connected to the shoes 7 and slide in guide plates 15 mounted in the outer ends of the brake cylinder 11 and carried by the casing 10. It is clear that when air is admitted into the cylinder 11, between the pistons 12, the pistons will be forced outwardly, in opposite directions, the shoes 7 sliding on the projections 8 and engaging the lining 6 of the brake drum 1.

The casing 10 is supplied with a pumping cylinder 16, the axis of which is located at right angles to the axis of the brake cylinder 11. In the pumping cylinder 16, a pumping piston 17 operates, the piston including a stem 18 held against rotation in a guide disk 19 which is threaded or mounted otherwise in the casing 10, as shown in Figure 1. An axle 21 is mounted in a fork 23 which is formed on the lower end of the stem 18 of the pumping piston 17, the axle having flattened ends 22. A roller 24 or other antifriction element is located within the fork 23 of the piston stem 18 and is journaled on the intermediate portion of the axle 21. The roller 24 is adapted, under circumstances which will be pointed out hereinafter, to cooperate with a cam 25 mounted on the end wall 2 of the brake drum, and, consequently, mounted to turn with the wheel of the vehicle.

Since the stem 18 of the pumping piston 17 is held against rotation in the guide disk 19, the wheel or roller 24 will always be presented properly to the cam 25, to roll around the cam when the cam rotates with the wheel of the vehicle.

Communication is established between the pumping cylinder 16 and the brake cylinder 11 by way of a passage including a small duct 26 communicating with the pumping cylinder 16, and an enlarged valve chamber 27 communicating with the brake cylinder 11. A valve 28, which may be a ball valve, is located in the chamber 27 and is adapted to seat toward the pumping cylinder 16, movement of the valve toward the brake cylinder 11 being limited by a retainer, such as a pin 29, threaded at 30, at its outer end, into the casing 10. The passage 26—27 has a lateral outlet made up of a valve chamber or bore 31 formed in the casing 10 and communicating by way of a small duct 32 with the valve chamber 27. A valve 33 is slidable in the chamber 31 and is adapted to move inwardly, thereby to close the duct 32. The outer end of the valve 33 is engaged by a lever 34, fulcrumed intermediate its ends at 35 on the casing 10. The lever 34 has a beveled end 36 and a shoulder 37, the beveled end 36 of the lever being adapted to cooperate with the beveled end 38 of a radius arm 39 mounted at 40 for swinging movement on the closure member 4 of the brake drum. The radius arm 39 has an opening 41 through which the stem 18 of the pumping piston 17 passes, and the flattened ends 22 of the axle 21 engage the lower surface of the radius arm 39. The function of the radius arm 39 is to steady the piston member 17—18 when the same moves downwardly. In order to aid in swinging the radius arm 39 downwardly a compression spring 42 is interposed between the arm 39 and a projection 43 on the fixed closure member 4, the radius arm having a stud 44 which retains the corresponding end of the spring 42 on the radius arm. Any suitable means (not shown) may be provided for adjusting the compressive effort of the spring 42. An oil duct 45 is formed in the member 4, as shown in Figure 4, and has a movable closure 46. The duct 45 communicates with a passage 47 in the casing 10, the passage opening into the pumping cylinder 16 so that oil can be delivered into the lower portion of the cylinder 16, to lubricate the cylinder, the oil running down the stem 18 of the piston 17 and effecting a lubrication of the roller 24. Air is admitted into the pumping cylinder 16 above the piston 17 by way of a duct 48 and a valve chamber 49, formed in the casing 10, there being a valve 50 movable in the chamber 49, and held therein by a valve seat 51 threaded into the casing. The air finds its way into the valve chamber 49 through a bore 52 in the member 4, the bore communicating with an inlet casing 53 on the member 4, the casing being provided with a closure 54 having a lug 55 adapted to engage the inlet casing 53, the closure 54 being held opened far enough so that air can enter the casing 53, and be closed sufficiently so that dirt cannot find its way to any appreciable extent into the casing 53.

There is an armature 56 on the lever 34, the lever being swung inwardly, toward the casing 10 by a compression spring 57 interposed between the lever and a lug 58 on the member 4. The armature 56 is responsive to an electromagnet 59 supported on the member 4. The electro-magnet 59 is grounded, as indicated at 60, at one side, on any accessible portion of the vehicle frame. From the opposite side of the electro-magnet 59, a conductor 61 leads. The numeral 62 designates a conductor wherein a source of electrical energy 63 is interposed, the conductor 62 being grounded as at 64.

The numeral 65 marks the foot board of the vehicle. On the foot board 65 is mounted an arcuate housing 66. Within the housing 66 is located a terminal 67 connected to the conductor 62. In the housing 66 is located a terminal 68 which is connected to the conductor 61. Other terminals 69 are disposed within the housing 66 and are located between the terminals 67 and 68. The terminals 69 are connected by resistance elements 70, the lowermost one of the terminals 69 being connected to the terminal 68 by a resistance element of the kind hereinbefore described. An arm 71 is pivoted at 72 to the foot board 65 and operates therebeneath. The arm 71 is thrust upwardly against the under surface of the foot board 65 by a compression spring 73 interposed between the arm and the housing 66. A pedal 74 is provided and has a switch member 75 attached to the arm 71. The switch member 75 is adapted to traverse the contacts or terminals 67, 69 and 68.

In practical operation, the driver of the vehicle thrusts the pedal 74 downwardly, as far as it will go, until the switch member 75 cooperates with the terminals 67 and 68, thus cutting out all of the resistance elements 70 and permitting a maximum amount of current to flow to the electro-magnet 59 through a circuit comprising the ground 64, the source 63 of electrical energy, the conductor 62, the terminal 67, the switch member 75, the terminal 68, the conductor 61, the electro-magnet 59, and the ground 60. When the electro-magnet 59 is energized as aforesaid, the armature 56 is attracted and the lever 34 swings on its fulcrum 35, the valve 33 being closed, and the shoulder 37 of the lever 34 being detached from the radius arm 39, the radius arm swinging downwardly on its pivotal mounting 40, under the action of the springs 42, until the roller 24 cooperates with the cam 25, the piston mechanism 17—18 being carried downwardly, because the ends 32 of the axle 21 are engaged beneath the radius arm 39. When the wheel of the vehicle is rotated, rotation is imparted to the brake drum 1 and to the cam 25, the cam imparting reciprocation to the pumping piston 17—18. Air is pumped into the pumping cylinder 16, on the down-stroke of the piston 17, through the parts 53, 52, 49, and 48, the valve 50 opening to permit the entrance of air, the valve 28 being closed on the down-stroke of the piston 17. On the up-stroke of the piston 17, the valve 50 closes, and the valve 28 opens, and the air enters the brake cylinder 11, between the pistons 12, repeated strokes of the piston 17 causing sufficient air to be pumped into the brake cylinder 11 so as to force the pistons 12 apart, the shoes 7 being applied, thereby retarding the rotation of the wheel.

The operator can decrease the pressure with which the shoes 7 are applied, by permitting the pedal 74 to move upwardly, one after another of the resistance elements being cut in by contact between the corresponding terminals 69 and the switch member 75 of the pedal 74. The pull of the electro-magnet 59 on the armature 56 of the lever 34 thus may be lessened, thereby rendering the lever more and more completely responsive to the action of the spring 57, the upper end of the lever 34 (Figure 1) swinging outwardly, and the valve 33 being opened accordingly, whereupon air will flow from the space between the brake pistons 12, through an outlet comprising the valve chamber 27, the duct 32 and the valve chamber 31.

When it is desired to relieve the brake shoes 7 entirely from their hold on the lining 6 of the brake drum 1, the switch member 75 is permitted to move into the open position of Figure 5, the circuit of the magnet 59 being opened, and the magnet being deenergized, whereupon the spring 57 will move the lever 34 to the position shown in Figure 1, the air between the brake pistons flowing out through the passage formed by the parts 27, 32 and 31. The cam 25 will elevate the piston mechanism 17—18 and the radius arm 39 into the position shown in Figure 1, the beveled end 38 of the radius arm cooperating with the beveled end 36 of the lever 34, and the free end of the radius arm 39 finally engaging with the shoulder 37 on the lever 34. The friction between the piston 17 and the cylinder 16 will serve to hold the piston in the elevated position shown in Figure 1.

Although the electro-magnet 59 and attendant parts may properly be used for operating the lever 34, it will be understood that any other suitable means may be supplied for that purpose.

What is claimed is:—

1. A device for braking a vehicle wheel, comprising a brake cylinder, a pump cylinder communicating with the brake cylinder, a brake piston operating in the brake cylinder, a brake connected to the brake piston, a pump piston operating in the pump cylinder, means operated by a vehicle wheel, for moving the pump piston in one direction, mechanism for moving the pump piston in an opposite direction, a bleed valve for the brake cylinder, and means for controlling the valve, said means being so constructed as to serve as a latch for said mechanism, thereby to hold said mechanism in spaced relation to the means operated by a vehicle wheel.

2. In a device for braking a vehicle wheel, a brake cylinder, a pump cylinder communicating with the brake cylinder, a brake piston operating in the brake cylinder, a brake connected to the brake piston, a pump piston operating in the pump cylinder, means operated by a vehicle for moving the pump piston in one direction, a radius arm mounted for swinging movement and constituting means for moving the pump piston in an opposite direction, a bleed valve for the brake cylinder, a lever and a fulcrum therefor, the lever controlling the valve, and the lever being so constructed as to engage the radius arm thereby to hold the radius arm in spaced relation to the means operated by a vehicle wheel, and mechanism under the control of an operator for actuating the lever.

3. A device of the class described, constructed as set forth in claim 2 and further characterized by the fact that the last specified mechanism comprises an armature on the lever and an electro-magnet whereunto the armature is responsive, a circuit including the magnet, and a rheostat switch interposed in said circuit.

In testimony that I claim the foregoing as my own, I have hereto affixed my signature in the presence of two witnesses.

NELSON ASAPH TUCKER.

Witnesses:
JOHN E. KELEHER,
GEORGE J. WHITE.